United States Patent
Xue et al.

(10) Patent No.: US 11,790,641 B2
(45) Date of Patent: Oct. 17, 2023

(54) ANSWER EVALUATION METHOD, ANSWER EVALUATION SYSTEM, ELECTRONIC DEVICE, AND MEDIUM

(71) Applicant: BOE TECHNOLOGY GROUP CO., LTD., Beijing (CN)

(72) Inventors: Ruibin Xue, Beijing (CN); Guangwei Huang, Beijing (CN); Jibo Zhao, Beijing (CN); Bingchuan Shi, Beijing (CN); Yue Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 621 days.

(21) Appl. No.: 16/929,011

(22) Filed: Jul. 14, 2020

(65) Prior Publication Data
US 2021/0020059 A1 Jan. 21, 2021

(30) Foreign Application Priority Data
Jul. 15, 2019 (CN) .......................... 201910635999.X

(51) Int. Cl.
*G09B 7/06* (2006.01)
*G06V 10/82* (2022.01)
(Continued)

(52) U.S. Cl.
CPC ........ *G06V 10/82* (2022.01); *G06V 30/19147* (2022.01); *G06V 30/19173* (2022.01);
(Continued)

(58) Field of Classification Search
CPC ............... G09B 5/00; G09B 7/00; G09B 7/02
See application file for complete search history.

(56) References Cited

U.S. PATENT DOCUMENTS

| | | | |
|---|---|---|---|
| 2008/0227075 A1* | 9/2008 | Poor .................... | G09B 7/06 434/307 R |
| 2011/0151423 A1* | 6/2011 | Venable ............... | G09B 7/00 434/350 |

(Continued)

FOREIGN PATENT DOCUMENTS

| | | |
|---|---|---|
| CN | 106407936 A | 2/2017 |
| CN | 107506746 A | 12/2017 |

(Continued)

OTHER PUBLICATIONS

Office Action issued in corresponding Chinese Patent Application No. 201910635999.X, dated Jan. 28, 2021, with English translation.

*Primary Examiner* — Robert J Utama
(74) *Attorney, Agent, or Firm* — McDermott Will & Emery LLP

(57) ABSTRACT

The present disclosure provides an answer evaluation method, an answer evaluation system, an electronic device, and a medium. The method comprises: acquiring an answer image, for a test paper answered by a use; classifying the answer image based on a pre-trained test question classification model, so as to obtain an objective question answer area and a subjective question answer area; identifying at least one objective question in the objective question answer area and an objective question answers for each of the at least one objective question; identifying at least one subjective question in the subjective question answer area and a subjective question answers for each of the at least one subjective question; and determining a total score value of the test paper based on the objective question, the objective question answer, the subjective question and the subjective question answer.

11 Claims, 8 Drawing Sheets

(51) Int. Cl.
  *G06V 30/19*     (2022.01)
  *G06V 30/413*    (2022.01)
  *G06V 30/10*     (2022.01)

(52) U.S. Cl.
  CPC ............. *G06V 30/413* (2022.01); *G09B 7/06* (2013.01); *G06V 30/10* (2022.01)

(56) References Cited

U.S. PATENT DOCUMENTS

| | | | |
|---|---|---|---|
| 2012/0189999 A1* | 7/2012 | Uthman | G09B 7/02 434/335 |
| 2015/0187219 A1 | 7/2015 | Sheppard | |
| 2018/0293908 A1* | 10/2018 | Wang | G09B 7/04 |
| 2020/0090539 A1 | 3/2020 | He et al. | |

FOREIGN PATENT DOCUMENTS

| CN | 108764074 A | 11/2018 |
|---|---|---|
| CN | 108932508 A | 12/2018 |
| CN | 109101202 A | 12/2018 |
| JP | 2019113611 A | 7/2019 |

\* cited by examiner

ANSWER EVALUATION METHOD, ANSWER EVALUATION SYSTEM, ELECTRONIC DEVICE, AND MEDIUM

CROSS-REFERENCE TO RELATED APPLICATION

This application claims priority to Chinese Patent Application No. 201910635999.X filed on Jul. 15, 2019, the whole disclosure of which is incorporated herein by reference.

TECHNICAL FIELD

The present disclosure relates to the technical field of electronic marking, in particular to an answer evaluation method, an answer evaluation system, and an electronic device.

BACKGROUND

With the rapid development of computers and artificial intelligence, both work and life have been greatly improved, especially in the field of education. The traditional marking way takes more time, which causes great workload to teachers and even reduces teachers' lesson preparation time. In addition, subjective questions are usually reviewed manually, which has a strong subjectivity. According to the analysis of human brain work quality and work hours, long-term review may cause large errors in review. Moreover, the electronic marking of objective questions has relatively high requirements for answering methods, which results in inconvenience to the respondent.

SUMMARY

An embodiment of the present disclosure provides an answer evaluation method, comprising:
  acquiring an answer image, which is an image of a test paper having been answered by a user;
  classifying the answer image based on a pre-trained test question classification model, so as to obtain an objective question answer area and a subjective question answer area in the answer image;
  identifying at least one objective question in the objective question answer area and an objective question answer for each of the at least one objective question;
  identifying at least one subjective question in the subjective question answer area and a subjective question answer for each of the at least one subjective question; and
  determining a total score value of the test paper based on the at least one objective question, the objective question answer, the at least one subjective question and the subjective question answer.

For example, prior to classifying the answer image based on a pre-trained test question classification model, so as to obtain an objective question answer area and a subjective question answer area in the answer image, the method further comprises:
  acquiring an initial test question classification model;
  acquiring images of a plurality of sample test papers classified to a type of the test paper as a plurality of first training samples, wherein each of the plurality of first training samples comprising a label for an objective question answer area and a label for a subjective question answer area; and
  training the initial test question classification model by using the plurality of first training samples, so as to obtain the pre-trained test question classification model.

For example, the step of identifying at least one objective questions in the objective question answer area and an objective question answers for each of the at least one objective questions comprises:
  identifying, by using an optical character recognition, the at least one objective questions in the objective question answer area;
  acquiring an image of each of the at least one objective questions from the objective question answer area; and
  processing the image of each of the at least one objective question based on a pre-trained answer selection model, so as to determine the objective question answer for each of the at least one objective question.

For example, prior to the step of processing the image of each of the at least one objective question based on a pre-trained answer selection model, so as to determine the objective question answer for each of the at least one objective question, the method further comprises:
  acquiring an initial answer selection model;
  acquiring, for a plurality of objective question selection methods, images of a plurality of sample objective questions answered by using each of the plurality of objective question selection methods, as a plurality of second training samples of each of the plurality of objective question selection methods; and
  training the initial answer selection model based on the plurality of second training samples of each of the plurality of objective question selection methods, so as to obtain the pre-trained answer selection model.

For example, the step of identifying at least one subjective question in the subjective question answer area and a subjective question answers for each of the at least one subjective question comprises:
  identifying, by using an optical character recognition, the at least one subjective question in the subjective question answer area and the subjective question answer for each of the at least one subjective question.

For example, the at least one subjective question comprises: at least one first type subjective question with standard subjective question answer;
  wherein the step of determining a total score value of the test paper based on the at least one objective question, the objective question answer, the at least one subjective question and the subjective question answer comprises:
  acquiring a standard objective question answer for each of the at least one objective question;
  acquiring a standard subjective question answer for each of the at least one first type subjective question;
  matching the objective question answer to the standard objective question answer for each of the at least one objective question, so as to obtain a first matching result, and calculating an objective question score value according to the first matching result;
  matching the subjective question answer to the standard subjective question answer for each of the at least one first type subjective question, so as to obtain a second matching result, and calculating a first subjective question score value according to the second matching result; and
  determining the total score value based on the objective question score value and the first subjective question score value.

For example, the at least one subjective question comprises: at least one second type subjective question;

wherein the step of determining a total score value of the test paper based on the at least one objective question, the objective question answer, the at least one subjective question and the subjective question answer comprises:

acquiring a standard objective question answer for each of the at least one objective question;

matching the objective question answer to the standard objective question answer for each of the at least one objective question, so as to obtain a first matching result, and calculating an objective question score value according to the first matching result;

pushing the subjective question answer for each of the at least one second type subjective question to a reviewer terminal, receiving a score value for each of the at least one second type subjective question fed back by the reviewer terminal, and calculating a second subjective question score value according to the score value for each of the at least one second type subjective question; and determining the total score value based on the objective question score value and the second subjective question score value.

For example, the at least one subjective question comprises: at least one first type subjective question with standard subjective question answer, and at least one second type subjective question;

wherein the step of determining a total score value of the test paper based on the at least one objective question, the objective question answer, the at least one subjective question and the subjective question answers comprises:

acquiring a standard objective question answer for each of the at least one objective question;

acquiring a standard subjective question answers for each of the at least one first type subjective question;

matching the objective question answer to the standard objective question answer for each of the at least one objective question, so as to obtain a first matching result, and calculating an objective question score value according to the first matching result;

matching the subjective question answer to the standard subjective question answer for each of the at least one first type subjective question, so as to obtain a second matching result, and calculating a first subjective question score value according to the second matching result;

pushing the subjective question answer for each of the at least one second type subjective question to a reviewer terminal, receiving a score value for each of the at least one second type subjective questions fed back by the reviewer terminal, and calculating a second subjective question score value according to the score value for each of the at least one second type subjective question; and determining the total score value based on the objective question score value, the first subjective question score value and the second subjective question score value.

For example, after the step of determining a total score value of the test paper based on the at least one objective question, the objective question answer, the at least one subjective question and the subjective question answer, the method further comprises:

determining a target objective question among the at least one objective question based on the objective question answer, wherein a matching degree between the objective question answer for the target objective question and the standard objective question answer for the target objective question is lower than a first threshold;

determining a target subjective question among the at least one subjective question based on the subjective question answer, wherein a matching degree between the subjective question answer for the target subjective question and the standard subjective question answer for the target subjective question is lower than a second threshold, or a score value fed back by the reviewer terminal for the target subjective question is lower than a third threshold; and generating an error database of the user according to the target objective question and the target subjective question.

An embodiment of the present disclosure further provides an answer evaluation system, comprising:

a test paper entry unit, configured to acquire an answer image which is an image of a test paper having been answered by a user;

an answer classification acquisition unit, configured to classify the answer image based on a pre-trained test question classification model, so as to obtain an objective question answer area and a subjective question answer area in the answer image; to identify at least one objective question in the objective question answer area and an objective question answer for each of the at least one objective question; and to identify at least one subjective question in the subjective question answer area and a subjective question answer for each of the at least one subjective question; and a statistical unit, configured to determine a total score value of the test paper based on the at least one objective question, the objective question answer, the at least one subjective question, and the subjective question answer.

For example, the answer classification acquisition unit further comprises:

a first building module, configured to build an initial test question classification model;

a first training sample acquisition module, configured to acquire images of a plurality of sample test papers classified to a type of the test paper, as a plurality of first training samples, wherein each of the plurality of first training samples comprising a label for an objective question answer area and a label for a subjective question answer area; and a test question classification model training module, configured to train the initial test question classification model by using the plurality of first training samples, so as to obtain the pre-trained test question classification model.

For example, the answer classification acquisition unit further comprises:

an objective question answer identification sub-module, configured to identify, by using an optical character recognition, the at least one objective question in the objective question answer area;

an objective question answer identification sub-module, configured to acquire an image of each of the at least one objective question from the objective question answer area; and processing the image of each of the at least one objective question based on a pre-trained answer selection model, so as to determine the objective question answer for each of the at least one objective question.

For example, the answer classification acquisition unit further comprises:

a second building module, configured to build an initial answer selection model;

a second training sample acquisition module, configured to acquire, for a plurality of objective question selection methods, images of a plurality of sample objective questions answered by using each of the plurality of objective question selection methods, as a plurality of second training samples of each of the plurality of objective question selection methods; and an answer selection module training module, configured to train the initial answer selection model based on the plurality of second training samples of each of the plurality of objective question selection methods, so as to obtain the pre-trained answer selection model.

For example, the answer classification acquisition unit further comprises:

a subjective question identification sub-module, configured to identify, by using an optical character recognition, the at least one subjective question in the subjective question answer area and the subjective question answer for each of the at least one subjective question.

For example, the at least one subjective question comprises: at least one first type subjective question with standard subjective question answer;

the system further comprises:

a standard answer entry unit, configured to acquire a standard objective question answer for each of the at least one objective question; and to acquire a standard subjective question answer for each of the at least one first type subjective question;

an objective question evaluation unit, configured to match the objective question answer to the standard objective question answer for each of the at least one objective question, so as to obtain a first matching result, and calculating an objective question score value according to the first matching result; and a subjective question evaluation unit, configured to match the subjective question answer to the standard subjective question answer for each of the at least one first type subjective question, so as to obtain a second matching result, and calculating a first subjective question score value according to the second matching result;

the statistical unit, is configured to determine the total score value based on the objective question score value and the first subjective question score value.

For example, the at least one subjective question comprises: at least one second type subjective question;

a standard answer entry unit, configured to acquire a standard objective question answer for each of the at least one objective question;

an objective question evaluation unit, configured to match the objective question answer to the standard objective question answer for each of the at least one objective question, so as to obtain a first matching result, and calculating an objective question score value according to the first matching result;

a subjective question evaluation unit, configured to push the subjective question answer for each of the at least one second type subjective question to a reviewer terminal, receiving a score value for each of the at least one second type subjective question fed back by the reviewer terminal, and calculating a second subjective question score value according to the score value for each of the at least one second type subjective question; and the statistical unit, is configured to determine the total score value based on the objective question score value and the second subjective question score value.

For example, the at least one subjective question comprises: at least one first type subjective question with standard subjective question answer, and at least one second type subjective question;

the system further comprises:

a standard answer entry unit, configured to acquire a standard objective question answer for each of the at least one objective question; and to acquire a standard subjective question answers for each of the at least one first type subjective question;

an objective question evaluation unit, configured to match the objective question answer to the standard objective question answer for each of the at least one objective question, so as to obtain a first matching result, and calculating an objective question score value according to the first matching result; and a subjective question evaluation unit, configured to match the subjective question answer to the standard subjective question answer for each of the at least one first type subjective question, so as to obtain a second matching result, and calculating a first subjective question score value according to the second matching result; to push the subjective question answer for each of the at least one second type subjective question to a reviewer terminal, receiving a score value for each of the at least one second type subjective questions fed back by the reviewer terminal, and calculating a second subjective question score value according to the score value for each of the at least one second type subjective question;

the statistical unit, is configured to determine the total score value based on the objective question score value, the first subjective question score value and the second subjective question score value.

For example, the statistical unit, is further configured to:

determining a target objective question among the at least one objective question based on the objective question answer, wherein a matching degree between the objective question answer for the target objective question and the standard objective question answer for the target objective question is lower than a first threshold;

determining a target subjective question among the at least one subjective question based on the subjective question answer, wherein a matching degree between the subjective question answer for the target subjective question and the standard subjective question answer for the target subjective question is lower than a second threshold, or a score value fed back by the reviewer terminal for the target subjective question is lower than a third threshold; and generating an error database of the user according to the target objective question and the target subjective question.

An embodiment of the present disclosure further discloses an electronic device, comprising: a processor, a memory, and a computer program stored on the memory and executable by the processor, wherein the processor is configured to, when executing the computer program, perform the above-mentioned answer evaluation method.

An embodiment of the present disclosure further discloses a computer readable storage medium having computer instructions stored thereon that, when executed by the processor, perform the above-mentioned answer evaluation method.

BRIEF DESCRIPTION OF THE ACCOMPANYING DRAWINGS

FIG. 3B illustrates a schematic diagram of an image of a Math test paper sample provided by an embodiment of the present disclosure;

FIG. 3C illustrates a schematic diagram of an area division of a handwritten-answer test paper provided by an embodiment of the present disclosure;

FIG. 3D illustrates a schematic diagram of an area division of a machine-input-answer test paper provided by an embodiment of the present disclosure;

DETAILED DESCRIPTION

In order to make the above objects, features and advantages of the present disclosure more obvious and easier to understand, the present disclosure will be further described in detail in combination with the accompanying drawings and the specific embodiments.

Figure 1:
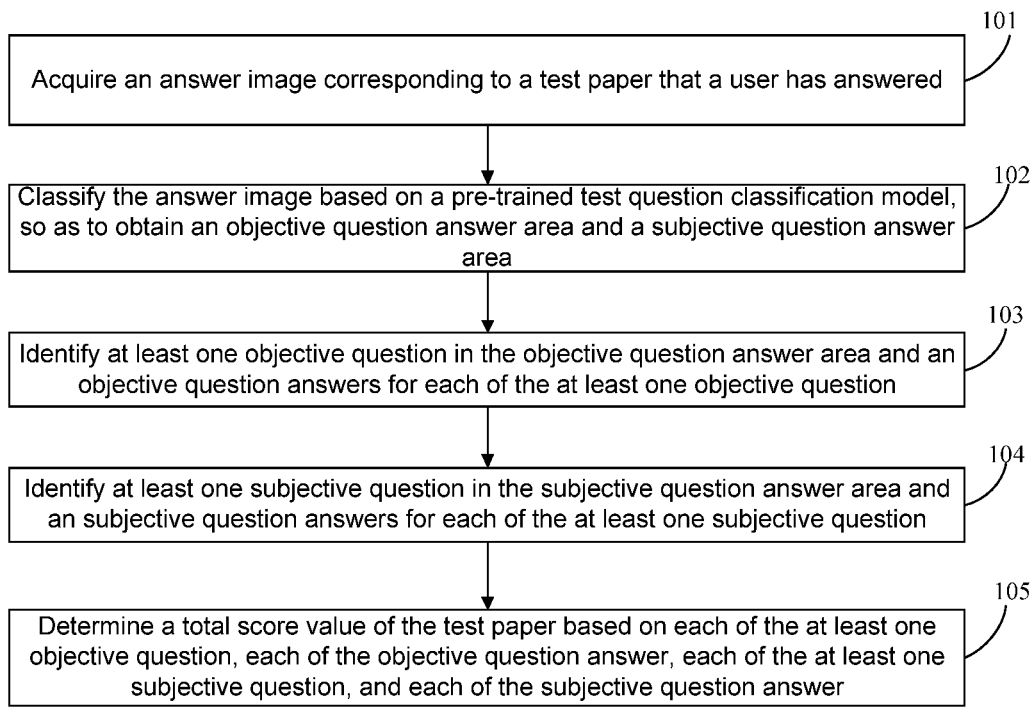
FIG. 1 illustrates a process flowchart of an answer evaluation method provided by an embodiment of the present disclosure.

Referring to FIG. 1, a process flowchart of an answer evaluation method provided by an embodiment of the present disclosure is shown, which may specifically comprise the following steps:

Step 101: Acquire an answer image corresponding to a test paper that a user has answered.

In the embodiment of the present disclosure, the user may be an examinee, such as a student or the like, which may be specifically determined according to the actual situation.

The test paper refers to a hard copy of test paper answered by the user, such as Chinese test paper, math test paper, English test paper and so on answered by the student in the test, which may be specifically determined according to the actual situation.

The answer image refers to an image obtained by photographing or scanning the test paper that the user has answered.

Figure 2:
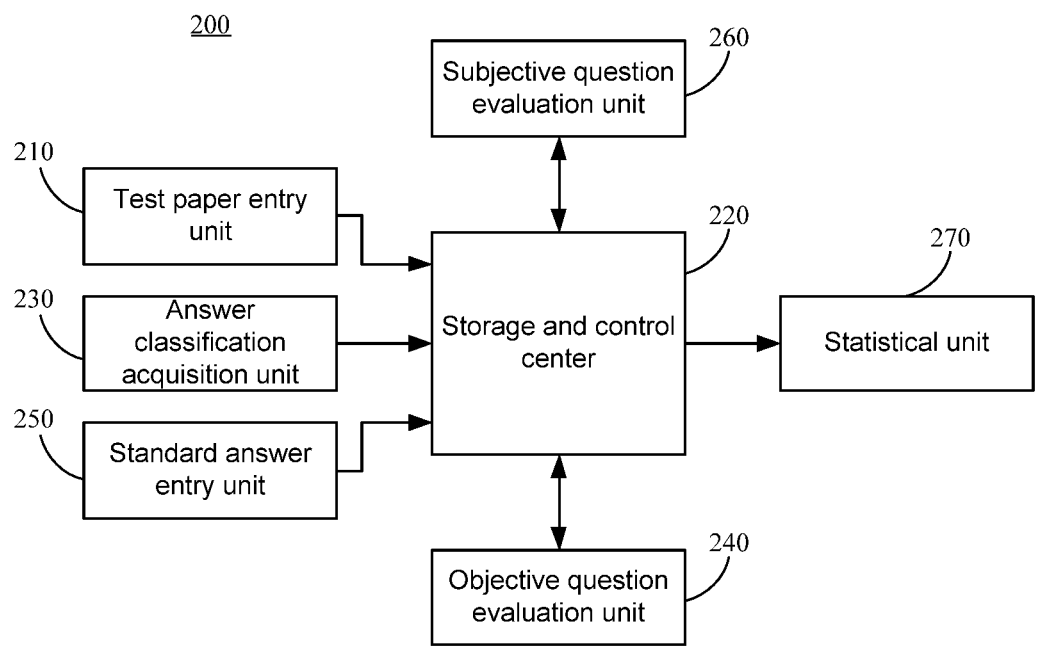
FIG. 2 illustrates a schematic diagram of an intelligent marking-assistant education system provided by an embodiment of the present disclosure.

The embodiment of the present disclosure provides an answer evaluation system, which can also be referred to as an intelligent marking-assistant education system, and the above answer evaluation method may be implemented by the system. As shown in FIG. 2, the system 200 may comprise a test paper entry unit 210, a storage and control center 220, an answer classification acquisition unit 230, an objective question evaluation unit 240, a standard answer entry unit 250, a subjective question evaluation unit 260, and a statistical unit 270. Each unit is described below. It should be noted that, the units in the system 200 may be implemented as hardware, or may be implemented as software module running on at least on processor, or may be implemented as the combination of the hardware and the software.

The test paper entry unit 210 may include, for example, a scanner or a camera, and the hard copy of test paper that the user has answered may be photographed by the scanner or the camera to form an electronic file, which is saved by a storage and control center 220 to a storage unit provided in the system. The storage unit may be a storage device such as a local hard disk.

The test paper entry unit 210 may also receive data such as pictures taken by a user terminal and transmit them to the storage and control center 220. If the user takes pictures with a mobile phone, the user's mobile phone needs to transmit the image data to the storage and control center 220 for the system to process.

In the embodiment of the present disclosure, the system 200 further comprises an answer classification acquisition unit 230, which may detect the answer image input by the test paper entry unit 210 by using a full-angle text detection network. The detection method may support two test paper scanning methods. One method is fixed test paper scanning, that is, the test paper is placed in a preset container of the test paper entry unit 210, and the camera and the container are fixedly connected at a predetermined angle. In this case, the answer image captured by the camera is not skewed and fully meets the recognition conditions, and may be directly identified by various detection networks. The other method is free scanning. If the user uses the mobile phone to take pictures autonomously, it is very likely that the answer image captured is skewed or distorted. The answer image obtained by the first scanning method is less difficult to detect. However, since it basically becomes a mainstream model that teachers and parents use smart phones and other smart terminals to guide students, the second scanning method is less difficult for users to operate. There is no need to purchase additional devices, and it is only required to install an APP (Application) on the mobile phone.

The full-angle text detection network may deal with the occurrence of skewing, distortion, blurring, and the like of text in the captured answer image, and has high algorithm accuracy and generalization. For example, a detection network capable of detecting text from 0 to 360 degrees may be designed as the full-angle text detection network. The full-angle text detection network has the following characteristics: 1) the detection network is built based on the Faster R-CNN target detection framework, and in the target detection, RPN (Region Proposal Network) may be used to generate a bounding box surrounding the text, the bounding box is an axisymmetric bounding box with direction and serves as the minimum-skew region box of the text surrounded by it; 2) a text score may be predicted while generating each bounding box; 3) a relatively smaller anchor box is added in the detection network to detect relatively smaller text in the answer image, and skew NMS (Non-maximum-suppression) algorithm is used to post-process the bounding box to obtain a final detection result; 4) the detection network simultaneously predicts the serial number of the bounding box; 5) it has high detection accuracy and fast speed for the rotation text.

It can be understood that the above example is only a test paper entry method enumerated for a better understanding of the technical solutions of the embodiments of the present disclosure. In the specific implementation, other test paper entry methods may also be adopted. It may be specifically determined according to business requirements and will not be described in detail in the embodiments of the present disclosure.

After acquiring the answer image corresponding to the test paper that the user has answered, step 102 is executed. Illustratively, this step may be implemented by the answer classification acquisition unit 230.

Step 102: Classify the answer image based on a pre-trained test question classification model, so as to obtain an objective question answer area and a subjective question answer area.

Figure 3A:
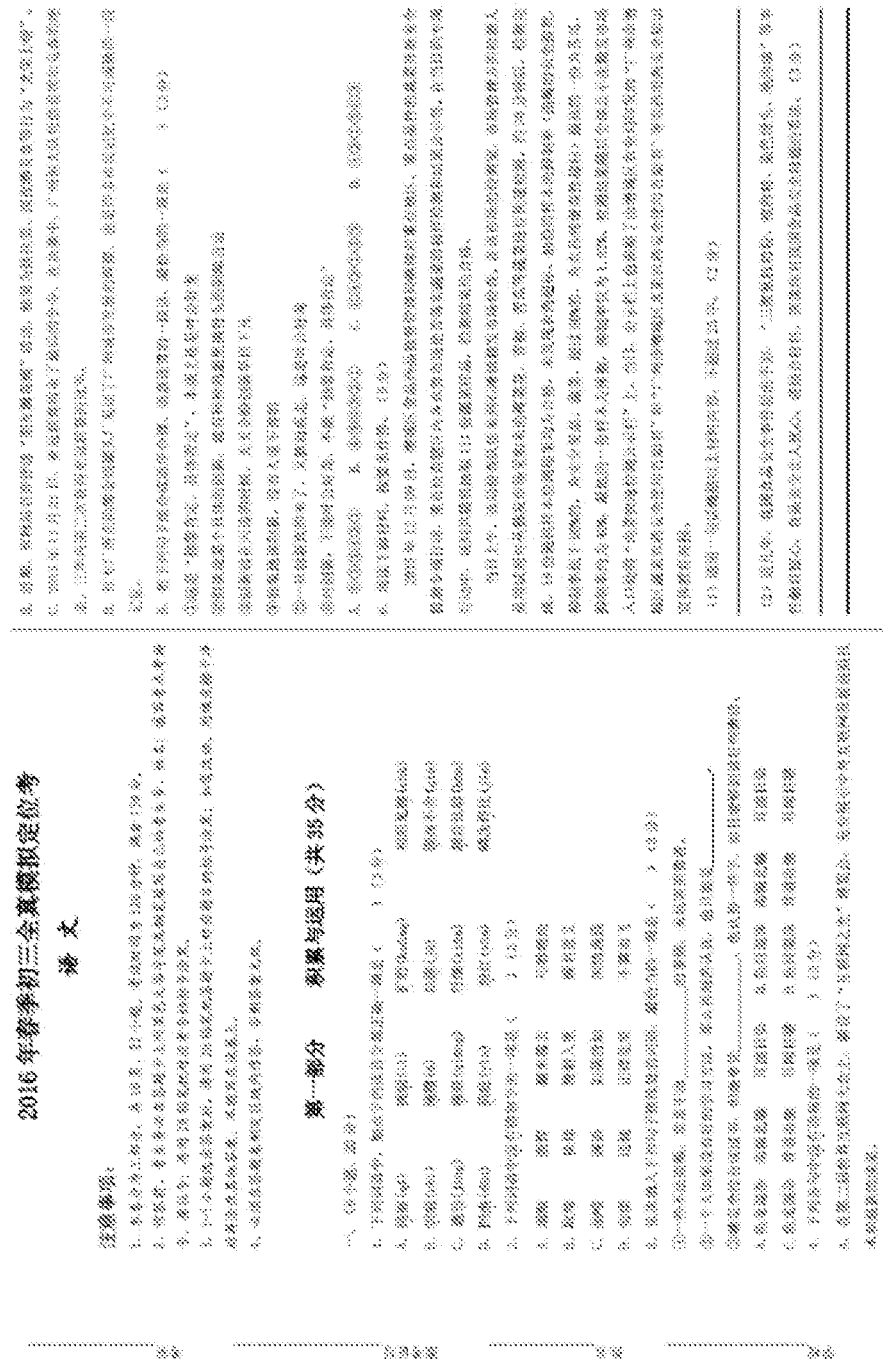
FIG. 3A illustrates a schematic diagram of an image of a Chinese test paper sample provided by an embodiment of the present disclosure.
Figures 3B, 3C, 3D:
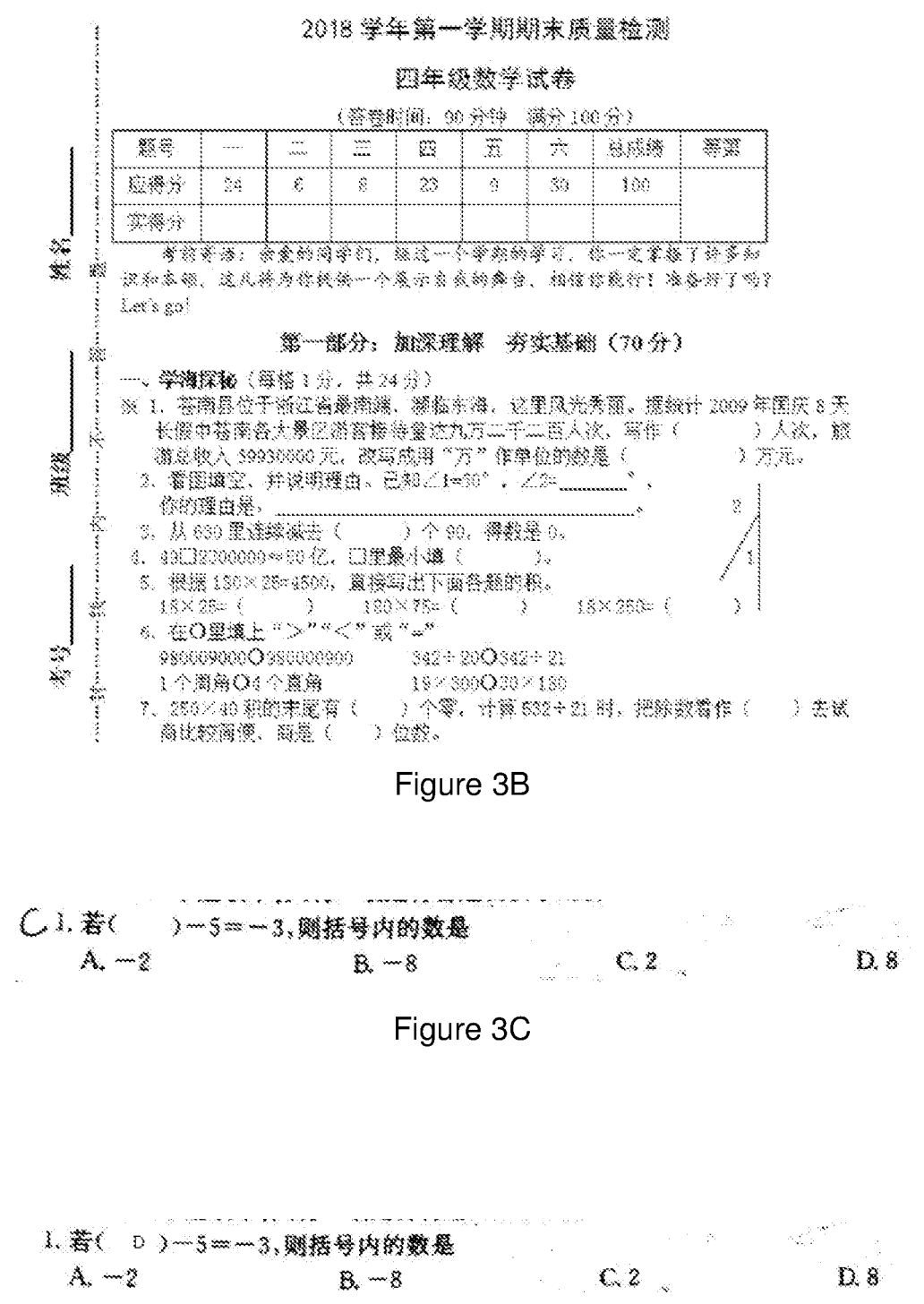

The objective question answer area refers to the answer area where the objective questions such as choice questions and true-false questions in the answer image are located. For example, referring to FIG. 3A, a schematic diagram of an image of a Chinese test paper sample provided by the embodiment of the present disclosure is shown. As shown in FIG. 3A, in the first part, choice questions in Parts 1, 2, 3, 4 and 5 are objective questions, and the area where these objective questions are located is the objective question answer area. For another example, referring to FIG. 3B, a schematic diagram of an image of a math test paper sample provided by the embodiment of the present disclosure is shown. As shown in FIG. 3B, the area where all the choice questions below "第一部分：加深理解 分实基础" are located is the objective question answer area.

The subjective question answer area refers to the answer area where the subjective questions (such as essay questions) in the test paper are located. For example, as shown in FIG. 3A, all the essay questions below Part 6 "阅读下面材料 按要求作答" are subjective questions, and the area where these essay questions are located is the subjective question answer area.

It should be understood that the above examples are only examples enumerated for better understanding of the technical solutions of the embodiments of the present disclosure, and are not intended as the only limitation to the embodiments of the present disclosure.

The test question classification model refers to a model pre-trained to classify the objective question answer area and the subjective question answer area in different types of test papers.

For the training process of the test question classification model, reference may be made to the description of the specific implementation below.

In a specific implementation of the present disclosure, prior to the above step 102, the method may further comprise:

Step A0: Build an initial test question classification model. Illustratively, the initial test question classification model may be a target detection model based on neural network.

Step A1: Acquire a plurality of first training samples of the a type of the test paper, each of the first training samples comprising a label for the objective question answer area and a label for the subjective question answer area.

In the embodiment of the present disclosure, a plurality of first training samples may be acquired for different test paper types, which may be Chinese, math, English, and so on.

However, in the embodiment of the present disclosure, the training may be performed only for the type of the test paper that the user has answered.

The images of the plurality of sample test papers of the same type as the test paper that the user has answered may be obtained as a plurality of training samples. For example, when the currently processed answer image is an image of a Chinese test paper, the images of a plurality of Chinese test paper samples shown in FIG. 3A may be used as the first training samples; or, when the currently processed answer image is an image of a math test paper, the images of a plurality of math test paper samples shown in FIG. 3B may be used as the first training samples.

Each of the first training samples may comprise a label for the objective question answer area and a label for the subjective question answer area.

After acquiring the plurality of first training samples of the same type as the test paper that the user has answered, step A2 is executed.

Step A2: Train the initial test question classification model by using the plurality of first training samples, so as to obtain the pre-trained test question classification model.

The initial test question classification model refers to the test question classification model that has not been trained.

After acquiring the plurality of first training samples, the plurality of first training samples may be input into the initial test question classification model to train the initial test question classification model, so as to obtain the test question classification model.

It should be understood that the training scheme for training neural network models using training samples is already a relatively mature technical scheme in the art, and will not be described in detail in the embodiments of the present disclosure.

After acquiring the answer image corresponding to the test paper that the user has answered, the answer image may be input into the pre-trained test question classification model to classify the answer image, so as to obtain the objective question answer area and the subjective question answer area in the answer image.

Of course, a test paper may contain only objective questions, or only subjective questions, or both subjective questions and objective questions. This may be specifically determined according to the actual situation and is not limited in the embodiments of the present disclosure.

Step 103: Identify at least one objective question in the objective question answer area and an objective question answers for each of the at least one objective question. Illustratively, this step 103 may be implemented by the answer classification acquisition unit 230 in the system 200.

The objective questions refer to the objective questions in the currently processed answer image.

The objective question answers refer to the answers made by the user to the objective questions in the currently processed answer image. For example, referring to FIG. 3C, a schematic diagram of an area division of a handwritten-answer test paper provided by an embodiment of the present disclosure is shown. As shown in FIG. 3C, the "C" handwritten by the user before the question number "1" is the objective question answer for the objective question with the question number "1". For another example, referring to FIG. 3D, a schematic diagram of an area division of a machine-input-answer test paper provided by an embodiment of the present disclosure is shown. As shown in FIG. 3D, the "D" input by the user in parentheses through the machine is the objective question answer to the objective question with the question number "1".

It should be understood that the above examples are only examples enumerated for better understanding of the technical solutions of the embodiments of the present disclosure, and are not intended as the only limitation to the embodiments of the present disclosure.

After classifying the answer image based on the pre-trained test question classification model to obtain the objective question answer area, OCR (Optical Character Recognition) may be used to identify the objective questions in the objective question answer area, so as to obtain at least one objective question in the objective question answer area and the objective question answer for each of the objective question.

Of course, in the present disclosure, different users may have different ways to answer the objective questions. For example, for choice questions, some users enter the selected answer in parentheses, some users mark the selected answer with "√", and some users write the selected answer before the question number. In the embodiment of the present disclosure, the corresponding answer selection model may be pre-trained according to the answer methods of the objective questions, and the objective question answers corresponding to each of the objective questions may be determined through the answer selection model. Specifically, it will be described in detail in the following specific implementation mode.

In a specific implementation of the present disclosure, the above step 103 may comprise:

Sub-step B1: Identify, by using an optical character recognition, at least one objective question in the objective question answer area.

In the embodiment of the present disclosure, for the objective question answer area obtained by the test question classification model, at least one objective question in the objective question answer area may be identified by using OCR technology, and sub-step B2 is executed.

Sub-step B2: Acquire an image of each of the objective questions from the objective question answer area.

For example, the image of each of the objective questions may be as shown in FIG. 3C or FIG. 3D.

Sub-step B3: Process the image of each of the objective questions based on the pre-trained answer selection model, so as to determine the objective question answer for the objective question.

The answer selection model refers to the model used to determine the answer to the objective question (that is, the objective question answer).

After identifying the at least one objective question in the objective question answer area, the image of each of the objective questions may be input into the pre-trained answer selection model, and the objective question answers corresponding to each of the objective questions may be obtained according to the answer selection model.

The training process for the answer selection model may be as described in the following specific implementation mode.

In another specific implementation of the present disclosure, prior to the above sub-step B3, the method may further comprise:

Step C0: Build an initial answer selection model. Illustratively, the initial answer selection model may be a target detection model based on neural network.

Step C1: Acquire, for a plurality of objective question selection methods, images of a plurality of sample objective questions answered by using each of the plurality of objective question selection methods, as a plurality of second training samples of each of the plurality of objective question selection methods.

In the embodiment of the present disclosure, the objective question selection methods may include, for example, the method that some users input the selected answers in parentheses, the method that some users choose by marking the selected answers with "√", and the method that some users write the selected answers before the question numbers, and so on.

For the above objective question selection methods, a plurality of second training samples corresponding to each of the selection methods may be obtained respectively, and step C2 is executed.

Step C2: Train the initial answer selection model based on the plurality of second training samples corresponding to the plurality of objective question selection methods, so as to obtain the answer selection model.

The initial answer selection model refers to an answer selection model that has not been trained.

After acquiring the plurality of second training samples corresponding to each of the objective question selection methods, the corresponding plurality of second training samples may be input into the initial answer selection model for training, so as to obtain the answer selection model.

In the embodiment of the present disclosure, the answer selection model is used to determine different images of each of the objective questions that have been cut out, so as to obtain the objective question answers for each of the objective questions. For the above objective question selection methods, the classic SSD network may be used as the initial answer selection model. The SSD network can not only take into account the speed and accuracy, but also can adopt the end-to-end training method. In the case of small resolution, it can also ensure the accuracy of classification results. For the plurality of second training samples corresponding to each of the objective question selection methods mentioned above, a sample labeling tool is used to label the bounding box and category of the target, then the SSD network is trained with the labeled second training samples, and finally the answer selection model may be obtained.

Step 104: Identify at least one subjective question in the subjective question answer area and an subjective question answers for each of the at least one subjective question. Illustratively, this step 104 may be implemented by the answer classification acquisition unit 230 in the system 200.

The subjective questions refer to the subjective questions in the currently processed answer image.

The subjective question answers refer to the answers made by the user to each of the subjective questions in the currently processed answer image, such as the answer made by the examinee to the essay question in the Chinese test paper, or the answer to solution question in the math test paper, and so on.

It should be understood that the above examples are only examples enumerated for better understanding of the technical solutions of the embodiments of the present disclosure, and are not intended as the only limitation to the embodiments of the present disclosure.

After classifying the answer image based on the pre-trained test question classification model and obtaining the subjective question answer area, the subjective questions in the subjective question answer area may be identified by using the OCR (Optical Character Recognition), so as to obtain at least one subjective question in the subjective question answer area and the subjective answers for each of the subjective questions.

It should be understood that the above-mentioned step 103 and step 104 are executed in no order, that is, step 103 may be executed first, and then step 104 is executed; or step 104 may be executed first, and then step 103 is executed; or they may be executed simultaneously. Specifically, it may be determined according to the actual situation.

Step 105: Determine a total score value of the test paper based on each of the at least one objective question, each of the objective question answer, each of the at least one subjective question, and each of the subjective question answer.

With continued reference to FIG. 2, the system 200 in the embodiment of the present disclosure is further provided with an objective question evaluation unit 240 and a standard answer entry unit 250. The objective question evaluation unit 240 may obtain the at least one objective question and the corresponding objective question answers, compare the objective question answers with the standard answers for each of the objective questions, so as to acquire the objective questions answered correctly by the user, and give corresponding score values. The standard answers for each of the objective questions may be acquired by the standard answer entry unit 250.

The system 200 may also comprise a subjective question evaluation unit 260. The scoring for the subjective questions is divided into two processes. For the part with standard answers, the scoring may be implemented by an intelligent marking module of the subjective question evaluation unit 260. For example, in the part of the Chinese test paper where the upper or lower sentence needs to be filled in, the former sentence "to be or not to be" was given, and the corresponding standard answer is "that's a question". The scoring of similar subjective questions with standard answers may be realized by automatic marking, and the identification of this part needs to be realized by OCR handwritten-character recognition; or some primary school Chinese test questions give pin yin, and the students need to write the corresponding Chinese characters, then the entire recognition process is similar. For subjective questions without standard answers, the content of the answers filled by the examinee is identified through OCR for the reviewer to handle. The standard answers for the subjective questions may be acquired by the standard answer entry unit 250.

For the above process, reference may be made to the description process of the following specific implementation mode.

In a specific implementation of the present disclosure, the above step 105 may comprise:

Sub-step D1: For each of the objective questions, match the objective question answer to the standard objective question answer corresponding to each of the objective questions, and obtain an objective question score value according to each of the matching results. Illustratively, this sub-step D1 may be implemented by the objective question evaluation unit 240 in the system 200.

In the embodiment of the present disclosure, each of the objective questions has a corresponding standard objective question answer. After obtaining the objective question answers made by the user to each of the objective questions, the objective question answers made by the user may be respectively matched to the standard objective question answers for each of the objective questions. Furthermore, according to the matching results, the objective question score value (that is, the total score value of the objective questions answered correctly by the user) may be obtained according to the matching results and the score values corresponding to each of the objective questions.

Sub-step D2: For each of the subjective questions with standard answers, match the subjective question answers corresponding to each of the subjective questions to the standard subjective question answers, and obtain the first subjective question score value according to each of the matching results.

Some subjective questions with standard subjective question answers may be referred to as first type subjective questions. For this part of subjective questions, after obtaining the subjective question answers made by the user to the subjective questions, the subjective question answers made by the user to the first type subjective questions may be respectively matched to the standard subjective question answers for each of the first type subjective questions. Furthermore, the first subjective question score value (that is, the total score value of the subjective questions with standard answers correctly answered by the user) may be obtained according to the matching results and the score values corresponding to each of the first type subjective questions.

Sub-step D3: For each of the subjective questions without standard answers, push each of the subjective questions to a reviewer, receive the score value of each of the subjective questions fed back by the reviewer, and obtain a second subjective question score value according to each of the score values.

The subjective questions without standard answers may be referred to as second type subjective questions. For this part of subjective questions without standard answers, the subjective question answers for the second type subjective questions may be pushed to the reviewer (such as teachers, parents, etc.), then the reviewer reviews these subjective questions and gives corresponding score values. The system of the present disclosure receives the score values of subjective questions without standard answers fed back by the reviewer, and obtains the second subjective question score value (that is, the total score value of the subjective questions without standard answers answered by the user) by counting the score values of each of the subjective questions without standard answers. Exemplarily, the sub-step D2 and sub-step D3 may be performed by the subjective question evaluation unit 260 shown in FIG. 2.

Sub-step D4: Determine the total score value based on the objective question score value, the first subjective question score value and/or the second subjective question score value.

After obtaining the above score values, the objective question score value, the first subjective question score value and the second subjective question score value may be added together to obtain the total score value of the test paper answered by the user. If there is no objective question in the answer image, the objective question score value is 0. If there is no first subjective question in the answer image, the first subjective question score value is 0. If there is no second subjective question in the answer image, the second subjective question score value is 0.

First, in an embodiment, the intelligent marking system 200 may identify various types of test papers (such as Chinese, mathematics, English, etc.), and the user may directly input the answer image to the system 200. In another embodiment, according to the unique characteristics of each type of test paper, the intelligent marking system 200 may detect and identify test papers by types. For example, a user terminal APP is provided, in which different types of test papers are processed separately. Although there is one more operation for the user, the accuracy rate is greatly improved. For example, most of the answers to Chinese test questions are characters, while most of the answers to math test questions are symbols. Therefore, a targeted training model will make the processing results more accurate. Second, the embodiments of the present disclosure uses a neural network capable of effectively recognizing symbols to assist the current OCR recognition technology, which can realize recognition for multiple languages, recognition for multiple fonts, and recognition under natural conditions, such as the recognition of street signs, store plaques, and so on. These recognitions involve different lighting conditions and different fonts (such as some artistic characters). The recognition performance of the neural network for symbols makes the processing effect of the marking system improved qualitatively. For example, the recognition effect for subjective questions in chemistry and physics test papers will be greatly improved.

The embodiments of the present disclosure may automatically identify the titles and answers of the objective questions, so students do not need to use 2B pencils to answer, the operation is simple, and the situation of misapplication and omission is reduced. The title and answer of the subjective question may also be identified, and the electronic marking of the subjective question is realized, reducing the difference in the marking of the subjective questions, and improving the accuracy of the marking.

The answer evaluation method provided by the embodiment of the present disclosure comprises acquiring the answer image corresponding to the test paper that the user has answered, classifying the answer image based on the pre-trained test question classification model, obtaining the objective question answer area and the subjective question answer area, identifying at least one objective question in the objective question answer area and the objective question answer corresponding to each of the at least one objective question, identifying at least one subjective question in the subject question answer area and the subjective answer corresponding to each of the at least one subjective question, and determining the total score value of the test paper based on each of the objective questions, each of the objective question answers, each of the subjective questions and each of the subjective question answers. The embodiments of the present disclosure may automatically identify the titles and answers of the objective questions, so students do not need to use 2B pencils to answer, the operation is simple, and the situation of misapplication and omission is reduced; the titles and answers of the subjective questions may also be identified, and the electronic marking of the subjective questions is realized, reducing the difference in the marking of the subjective questions, and improving the accuracy of the marking.

Figure 4:
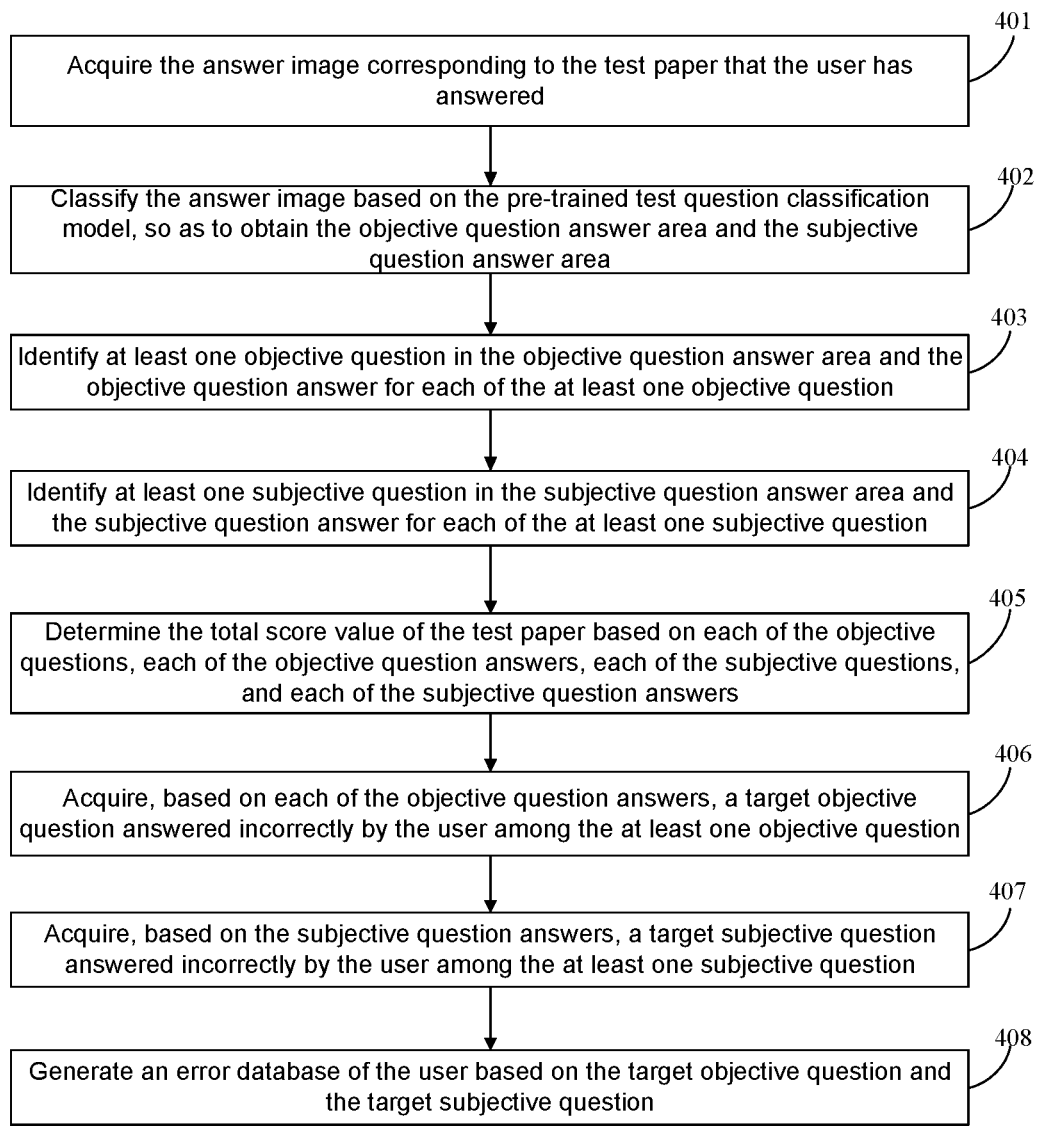
FIG. 4 illustrates a process flowchart of an answer evaluation method provided by an embodiment of the present disclosure.

Referring to FIG. 4, a process flowchart of an answer evaluation method provided by an embodiment of the present disclosure is shown, which may specifically comprise the following steps:

Step 401: Acquire the answer image corresponding to the test paper that the user has answered.

Step 402: Classify the answer image based on the pre-trained test question classification model, so as to obtain the objective question answer area and the subjective question answer area.

Step 403: Identify at least one objective question in the objective question answer area and the objective question answer for each of the at least one objective question.

Step 404: Identify at least one subjective question in the subjective question answer area and the subjective question answer for each of the at least one subjective question.

Step 405: Determine the total score value of the test paper based on each of the objective questions, each of the objective question answers, each of the subjective questions, and each of the subjective question answers.

It can be understood that the implementation mode of the above steps 401 to 405 is similar to the implementation mode of the steps 101 to 105 in the above method embodiments, which will not be repeated here.

Furthermore, illustratively, the statistical unit 270 in the system 200 shown in FIG. 2 may perform the following steps 406-408, so as to collect the questions answered incorrectly by the user.

Step 406: Acquire, based on each of the objective question answers, a target objective question answered incorrectly by the user among the at least one objective question.

The target objective question refers to the objective question answered incorrectly by the user in the test paper that the user has answered. For each of the objective question, the objective question answer for the objective question may be matched to the standard objective question answer for the objective question, and a matching degree may be obtained. If the matching degree is lower than a first threshold, means that the objective question answer for the objective question is different from the standard objective question answer for the objective question, the objective question can be identified as a target objective question, wherein the first threshold may be pre-set as needed. For example, the first threshold may be pre-set according to the identification precision of the pre-trained answer selection model for identifying the objective question answer.

After the objective question answers are acquired, they may be compared with each of the standard objective question answers, so as to obtain the target objective question answered incorrectly by the user among the at least one objective question.

Step 407: Acquire, based on the subjective question answers, a target subjective question answered incorrectly by the user among the at least one subjective question.

The target subjective question refers to the subjective question answered incorrectly by the user in the test paper that the user has answered. For each of the first type subjective question, the subjective question answer for the first type subjective question may be matched to the standard subjective question answer for the first type subjective question, and a matching degree may be obtained. If the matching degree is lower than a second threshold, means that subjective question answer for the first type subjective question is different from the standard subjective question answer for the first type subjective question, the first type subjective question can be identified as a target subjective question. For each of the second type subjective question, if the score value fed back by the reviewer terminal for the second type subjective question is lower than a third threshold, the first type subjective question can be identified as a target subjective question. Wherein the second threshold and the third threshold may be pre-set as needed. For example, the second threshold and the third threshold may be pre-set according to the identification precision of the OCR technology for identifying the subjective question answer.

After the subjective question answers are acquired, for the subjective questions with standard answers, the subjective question answers made by the user may be compared with each of the standard subjective question answers, so as to obtain the target subjective question answered incorrectly by the user among the at least one subjective question.

For the subjective questions without standard answers, the score value of the subjective question answer fed back by the reviewer terminal may be compared with the full score of the subjective question. If the score value of the subjective question answer is relatively low, the subjective question may be determined as a target subjective question.

Step 408: Generate an error database of the user based on the target objective question and the target subjective question.

After the target objective question and the target subjective question are acquired, the error database of the user may be generated according to the target objective question and the target subjective question.

As shown in FIG. 2, the statistical unit 270 of the system 200 of the embodiment of the present disclosure adopts an error totalization module to count the score values of the examinee, and collects the questions answered incorrectly by the examinee, so as to facilitate the teachers and the students' parents to track the students' learning situation in real time The answer evaluation method provided by the embodiment of the present disclosure comprises acquiring the answer image corresponding to the test paper that the user has answered, classifying the answer image based on the pre-trained test question classification model, obtaining the objective question answer area and the subjective question answer area, identifying at least one objective question in the objective question answer area and the objective question answer corresponding to each of the objective question, identifying at least one subjective question in the subject question answer area and the subjective answer corresponding to each of the subjective question, and determining the total score value of the test paper based on each of the objective questions, each of the objective question answers, each of the subjective questions and each of the subjective question answers. The embodiments of the present disclosure may automatically identify the titles and answers of the objective questions, so students do not need to use 2B pencils to answer, the operation is simple, and the situation of misapplication and omission is reduced; the titles and answers of the subjective questions may also be identified, and the electronic marking of the subjective questions is realized, reducing the difference in the marking of the subjective questions, and improving the accuracy of the marking.

Figure 5:
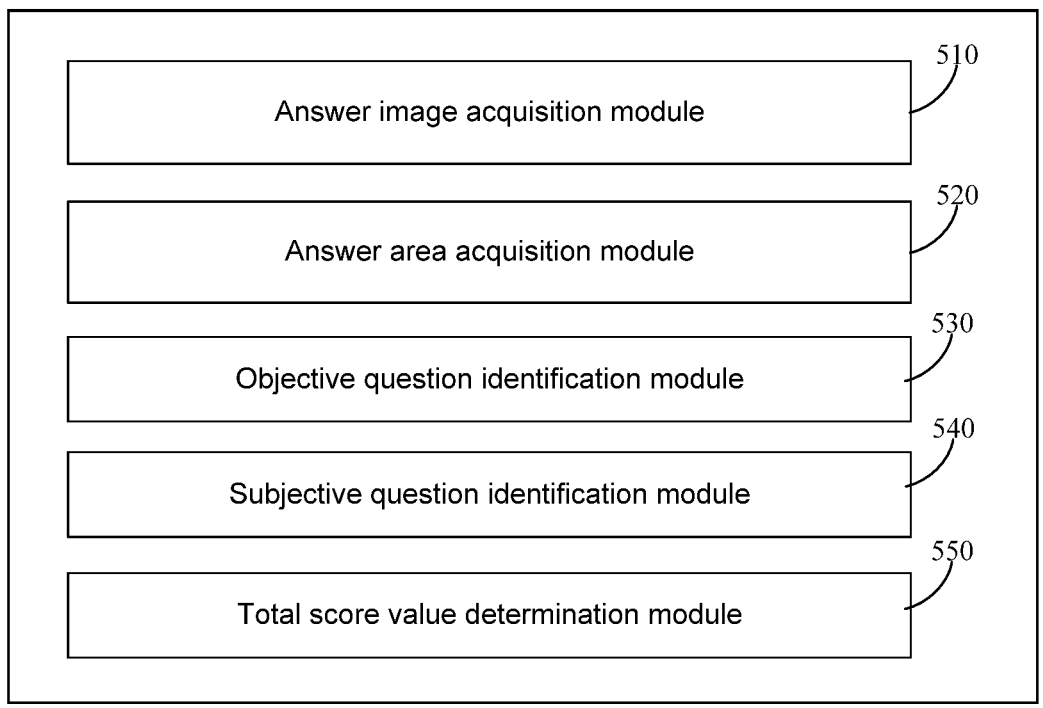
FIG. 5 illustrates a schematic structure diagram of an answer evaluation apparatus provided by an embodiment of the present disclosure.

Referring to FIG. 5, a schematic structure diagram of an answer evaluation apparatus provided by an embodiment of the present disclosure is shown, which may specifically comprise the following modules:

an answer image acquisition module 510, configured to acquire the answer image corresponding to the test paper that the user has answered;

an answer area acquisition module 520, configured to classify the answer image based on the pre-trained test question classification model, so as to obtain the objective question answer area and the subjective question answer area;

an objective question identification module 530, configured to identify at least one objective question in the objective question answer area and the objective question answers for each of the objective questions;

a subjective question identification module 540, configured to identify at least one subjective question in the subjective question answer area and the subjective question answers for each of the subjective questions; and a total score value determination module 550, configured to determine the total score value of the test paper based on each of the objective questions, each of the objective question answers, each of the subjective questions, and each of the subjective question answers.

For example, the above apparatus may further comprise: a first training sample acquisition module configured to acquire a plurality of first training samples of the same type as the test paper, each of the first training samples comprising a label for the objective question answer area and a label for the subjective question answer area; and a test question classification model training module configured to train the initial test question classification model by using the plurality of first training samples, so as to obtain the test question classification model.

For example, the objective question identification module 530 comprises: an objective question identification sub-module configured to identify at least one objective question in the objective question answer area by using the optical character recognition; and an objective question answer identification sub-module configured to determine the objective question answers corresponding to each of the objective questions based on the pre-trained answer selection model.

For example, the above apparatus may further comprise: a second training sample acquisition module configured to, for a plurality of objective question selection methods, acquire a plurality of second training samples corresponding to each of the objective question selection methods; and an answer selection model training module configured to train the initial answer selection model based on the plurality of second training samples respectively corresponding to the plurality of objective question selection methods, so as to obtain the answer selection model.

For example, the subjective question identification module 540 comprises: a subjective question identification sub-module configured to identify, by using the optical character recognition, at least one subjective question in the subjective question answer area and the subjective question answers corresponding to each of the subjective questions.

For example, the subjective questions comprise at least one subjective question with standard answers and/or at least one subjective question without standard answers. The total score value determination module 550 comprises: an objective question score value counting sub-module configured to, for each of the objective questions, match the objective question answers corresponding to each of the objective questions to the standard objective question answers, and obtain the objective question score value according to each of the matching results; a first subjective question score value counting sub-module configured to, for each of the subjective questions with standard questions, match the subjective question answers corresponding to the subjective questions to the standard subjective question answers, and obtain the first subjective question score value according to each of the matching results; a second subjective question score value counting sub-module configured to, for each of the subjective questions without standard answers, push each of the subjective questions to the reviewer, receive the score values for each of the subjective questions fed back by the reviewer, and obtain the second subjective question score value according to each of the score values; and a total score value determination sub-module configured to determine the total score value based on the objective question score value, the first subjective question score value and/or the second subjective question score value.

The answer evaluation apparatus provided by the embodiment of the present disclosure acquires the answer image corresponding to the test paper that the user has answered, classifies the answer image based on the pre-trained test question classification model, obtains the objective question answer area and the subjective question answer area, identifies at least one objective question in the objective question answer area and the objective question answers corresponding to each of the objective questions, identifies at least one subjective question in the subject question answer area and the subjective answers corresponding to each of the subjective questions, and determines the total score value of the test paper based on each of the objective questions, each of the objective question answers, each of the subjective questions and each of the subjective question answers. The embodiments of the present disclosure may automatically identify the titles and answers of the objective questions, so students do not need to use 2B pencils to answer, the operation is simple, and the situation of misapplication and omission is reduced; the titles and answers of the subjective questions may also be identified, and the electronic marking of the subjective questions is realized, reducing the difference in the marking of the subjective questions, and improving the accuracy of the marking.

Figure 6:
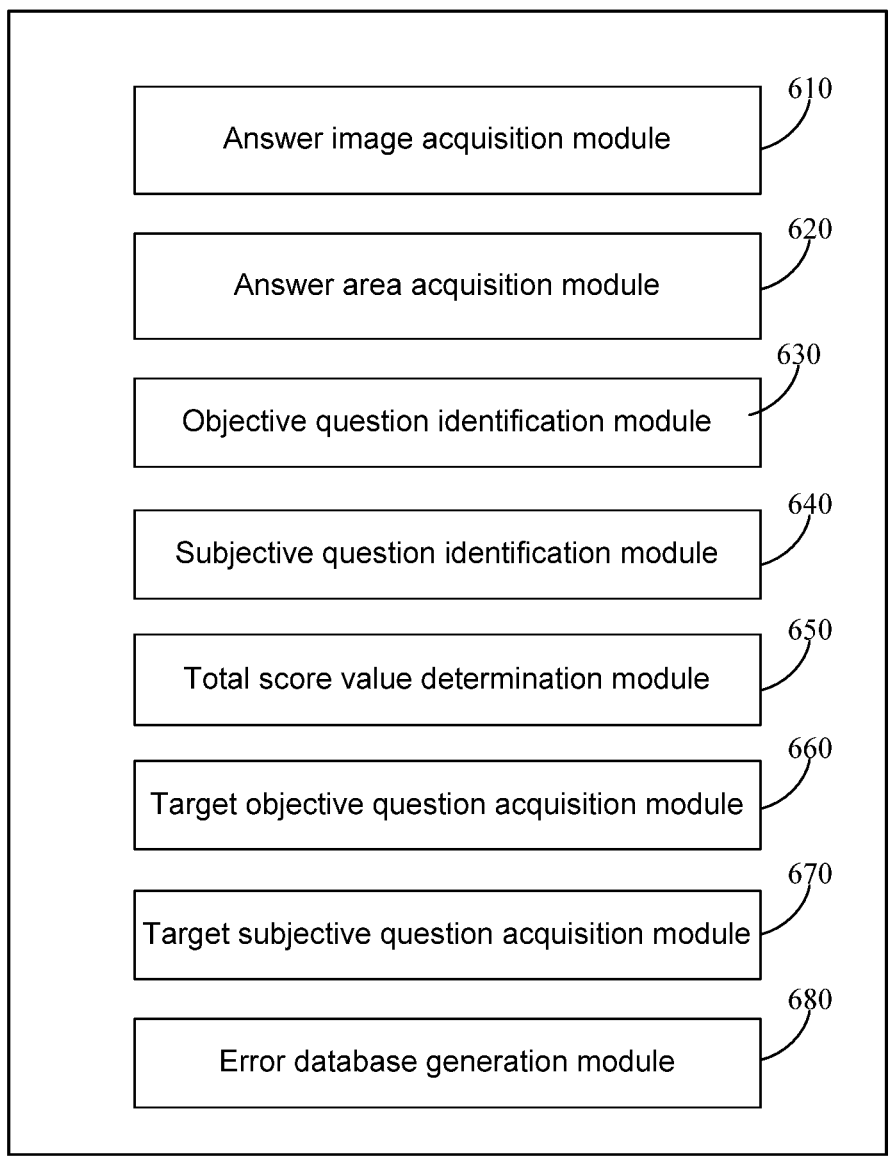
FIG. 6 illustrates a schematic structure diagram of an answer evaluation apparatus provided by an embodiment of the present disclosure.

Referring to FIG. 6, a structure diagram of an answer evaluation apparatus provided by an embodiment of the present disclosure is shown, which may specifically comprise the following modules:

an answer image acquisition module 610, configured to acquire an answer image corresponding to the test paper that the user has answered;

an answer area acquisition module 620, configured to classify the answer image based on a pre-trained test question classification model, so as to obtain the objective question answer area and the subjective question answer area;

an objective question identification module 630, configured to identify at least one objective question in the objective question answer area and the objective question answers for each of the objective questions;

a subjective question identification module 640, configured to identify at least one subjective question in the subjective question answer area and the subjective question answers for each of the subjective questions;

a total score value determination module 650, configured to determine a total score value of the test paper based on each of the objective questions, each of the objective question answers, each of the subjective questions, and each of the subjective question answers;

a target objective question acquisition module 660, configured to acquire, based on each of the objective question answers, at least one target objective questions answered incorrectly by the user among the at least one objective question;

a target subjective question acquisition module 670, configured to acquire, based on each of the subjective question answers, at least one target subjective questions answered incorrectly by the user among the at least one subjective question; and an error database generation module 680, configured to generate the error database of the user based on the target objective question and the target subjective question.

The answer evaluation apparatus provided by the embodiment of the present disclosure acquires the answer image corresponding to the test paper that the user has answered, classifies the answer image based on the pre-trained test question classification model, obtains the objective question answer area and the subjective question answer area, identifies at least one objective question in the objective question answer area and the objective question answers corresponding to each of the objective questions, identifies at least one subjective question in the subject question answer area and the subjective answers corresponding to each of the subjective questions, and determines the total score value of the test paper based on each of the objective questions, each of the objective question answers, each of the subjective questions and each of the subjective question answers. The embodiments of the present disclosure may automatically identify the titles and answers of the objective questions, so students do not need to use 2B pencils to answer, the operation is simple, and the situation of misapplication and omission is reduced; the titles and answers of the subjective questions may also be identified, and the electronic marking of the subjective questions is realized, reducing the difference in the marking of the subjective questions, and improving the accuracy of the marking.

Figure 7:
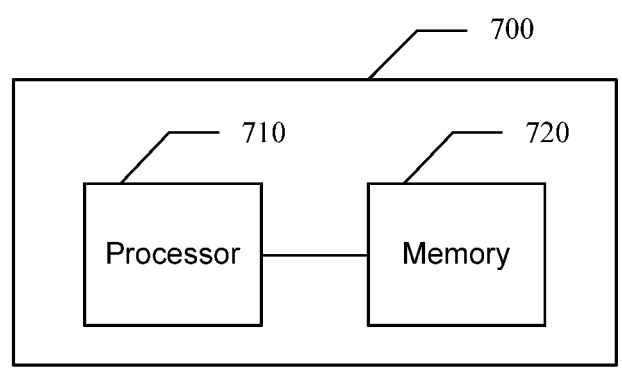
FIG. 7 illustrates a schematic structure diagram of an electronic device provided by an embodiment of the present disclosure.

In another embodiment of the present disclosure, an electronic device is further provided. FIG. 7 shows a block diagram of an electronic device to which the above-mentioned answer evaluation method is applicable according to an embodiment of the present disclosure. As shown in FIG. 7, the electronic device 700 may comprise a processor 710, a memory 720, and a computer program stored on the memory and executable on the processor, and when the processor executes the program, the answer evaluation method in the above embodiments is implemented.

The embodiments in the specification are described in a progressive manner. Each of the embodiments focuses on the differences from other embodiments, and the same or similar parts between the embodiments may be referred to each other.

Finally, it should also be noted that in the present disclosure, relational terms such as first and second are used only to distinguish one entity or operation from another entity or operation, and do not necessarily require or imply any such actual relationship or order between these entities or operations. Moreover, the terms "include", "comprise" or any other variant thereof are intended to cover non-exclusive inclusion, so that a process, method, commodity or apparatus including a series of elements includes not only those elements, but also other elements not specifically listed, or those inherent to such process, method, product or apparatus. In the absence of more limitations, the element defined by the term "including one . . . " does not exclude the existence of another identical element in the process, method, product or apparatus including the element.

The answer evaluation method, answer evaluation apparatus, and electronic device provided in the present disclosure are described in detail. In the present disclosure, specific examples are applied to explain the principle and implementation mode of the present disclosure. The above embodiments are only described to help understand the method and core idea of the present disclosure. Meanwhile, for those general skilled in the art, there will be changes in the specific implementation mode and application scope according to the idea of the present disclosure. In summary, the contents of the specification should not be construed as limiting the present disclosure.

The invention claimed is:

1. An answer evaluation method, comprising:

acquiring an answer image, which is an image of a test paper having been answered by a user;

classifying the answer image based on a pre-trained test question classification model, so as to obtain an objective question answer area and a subjective question answer area in the answer image;

identifying at least one objective question in the objective question answer area and an objective question answer for each of the at least one objective question;

identifying at least one subjective question in the subjective question answer area and a subjective question answer for each of the at least one subjective question; and determining a total score value of the test paper based on the at least one objective question, the objective question answer, the at least one subjective question and the subjective question answer, wherein, the step of identifying at least one subjective question in the subjective question answer area and a subjective question answers for each of the at least one subjective question comprises:

identifying, by using an optical character recognition, the at least one subjective question in the subjective question answer area and the subjective question answer for each of the at least one subjective question, wherein the at least one subjective question comprises: at least one second type subjective question, and wherein the step of determining a total score value of the test paper based on the at least one objective question, the objective question answer, the at least one subjective question and the subjective question answer comprises:
acquiring a standard objective question answer for each of the at least one objective question;
matching the objective question answer to the standard objective question answer for each of the at least one objective question, so as to obtain a first matching result, and calculating an objective question score value according to the first matching result;
pushing the subjective question answer for each of the at least one second type subjective question to a reviewer terminal, receiving a score value for each of the at least one second type subjective question fed back by the reviewer terminal, and calculating a second subjective question score value according to the score value for each of the at least one second type subjective question; and
determining the total score value based on the objective question score value and the second subjective question score value.

2. The method according to claim 1, wherein, prior to the step of classifying the answer image based on a pre-trained test question classification model, so as to obtain an objective question answer area and a subjective question answer area in the answer image, the method further comprises:
acquiring an initial test question classification model;
acquiring images of a plurality of sample test papers classified to a type of the test paper, as a plurality of first training samples, wherein each of the plurality of first training samples comprising a label for an objective question answer area and a label for a subjective question answer area; and
training the initial test question classification model by using the plurality of first training samples, so as to obtain the pre-trained test question classification model.

3. The method according to claim 1, wherein, the step of identifying at least one objective questions in the objective question answer area and an objective question answers for each of the at least one objective questions comprises:
identifying, by using an optical character recognition, the at least one objective questions in the objective question answer area;
acquiring an image of each of the at least one objective question from the objective question answer area; and
processing the image of each of the at least one objective question based on a pre-trained answer selection model, so as to determine the objective question answer for each of the at least one objective question.

4. The method according to claim 3, wherein, prior to the step of processing the image of each of the at least one objective question based on a pre-trained answer selection model, so as to determine the objective question answer for each of the at least one objective question, the method further comprises:
acquiring an initial answer selection model;
acquiring, for a plurality of objective question selection methods, images of a plurality of sample objective questions answered by using each of the plurality of objective question selection methods, as a plurality of second training samples of each of the plurality of objective question selection methods; and
training the initial answer selection model based on the plurality of second training samples of each of the plurality of objective question selection methods, so as to obtain the pre-trained answer selection model.

5. The method according to claim 1, wherein the at least one subjective question comprises: at least one first type subjective question with standard subjective question answer;
wherein the step of determining a total score value of the test paper based on the at least one objective question, the objective question answer, the at least one subjective question and the subjective question answer comprises:
acquiring a standard objective question answer for each of the at least one objective question;
acquiring a standard subjective question answer for each of the at least one first type subjective question;
matching the objective question answer to the standard objective question answer for each of the at least one objective question, so as to obtain a first matching result, and calculating an objective question score value according to the first matching result;
matching the subjective question answer to the standard subjective question answer for each of the at least one first type subjective question, so as to obtain a second matching result, and calculating a first subjective question score value according to the second matching result; and
determining the total score value based on the objective question score value and the first subjective question score value.

6. The method according to claim 1, wherein the at least one subjective question comprises: at least one first type subjective question with standard subjective question answer, and at least one second type subjective question;
wherein the step of determining a total score value of the test paper based on the at least one objective question, the objective question answer, the at least one subjective question and the subjective question answers comprises:
acquiring a standard objective question answer for each of the at least one objective question;
acquiring a standard subjective question answers for each of the at least one first type subjective question;
matching the objective question answer to the standard objective question answer for each of the at least one objective question, so as to obtain a first matching result, and calculating an objective question score value according to the first matching result;
matching the subjective question answer to the standard subjective question answer for each of the at least one first type subjective question, so as to obtain a second matching result, and calculating a first subjective question score value according to the second matching result;
pushing the subjective question answer for each of the at least one second type subjective question to a reviewer terminal, receiving a score value for each of the at least one second type subjective questions fed back by the reviewer terminal, and calculating a second subjective question score value according to the score value for each of the at least one second type subjective question; and
determining the total score value based on the objective question score value, the first subjective question score value and the second subjective question score value.

7. The method according to claim 6, wherein, after the step of determining a total score value of the test paper based on the at least one objective question, the objective question answer, the at least one subjective question and the subjective question answer, the method further comprises:

determining a target objective question among the at least one objective question based on the objective question answer, wherein a matching degree between the objective question answer for the target objective question and the standard objective question answer for the target objective question is lower than a first threshold;

determining a target subjective question among the at least one subjective question based on the subjective question answer, wherein a matching degree between the subjective question answer for the target subjective question and the standard subjective question answer for the target subjective question is lower than a second threshold, or a score value fed back by the reviewer terminal for the target subjective question is lower than a third threshold; and generating an error database of the user according to the target objective question and the target subjective question.

8. An answer evaluation system, comprising:

a test paper entry unit, configured to acquire an answer image which is an image of a test paper having been answered by a user;

an answer classification acquisition unit, configured to classify the answer image based on a pre-trained test question classification model, so as to obtain an objective question answer area and a subjective question answer area in the answer image; to identify at least one objective question in the objective question answer area and an objective question answer for each of the at least one objective question; and to identify at least one subjective question in the subjective question answer area and a subjective question answer for each of the at least one subjective question; and a statistical unit, configured to determine a total score value of the test paper based on the at least one objective question, the objective question answer, the at least one subjective question, and the subjective question answer, wherein the at least one subjective question comprises: at least one first type subjective question with standard subjective question answer, and at least one second type subjective question;

the system further comprises:

a standard answer entry unit, configured to acquire a standard objective question answer for each of the at least one objective question; and to acquire a standard subjective question answers for each of the at least one first type subjective question;

an objective question evaluation unit, configured to match the objective question answer to the standard objective question answer for each of the at least one objective question, so as to obtain a first matching result, and calculating an objective question score value according to the first matching result; and a subjective question evaluation unit, configured to match the subjective question answer to the standard subjective question answer for each of the at least one first type subjective question, so as to obtain a second matching result, and calculating a first subjective question score value according to the second matching result to push the subjective question answer for each of the at least one second type subjective question to a reviewer terminal, receiving a score value for each of the at least one second type subjective questions fed back by the reviewer terminal, and calculating a second subjective question score value according to the score value for each of the at least one second type subjective question, and the statistical unit, is configured to determine the total score value based on the objective question score value, the first subjective question score value and the second subjective question score value.

9. The system according to claim 8, wherein, the statistical unit, is further configured to:

determining a target objective question among the at least one objective question based on the objective question answer, wherein a matching degree between the objective question answer for the target objective question and the standard objective question answer for the target objective question is lower than a first threshold;

determining a target subjective question among the at least one subjective question based on the subjective question answer, wherein a matching degree between the subjective question answer for the target subjective question and the standard subjective question answer for the target subjective question is lower than a second threshold, or a score value fed back by the reviewer terminal for the target subjective question is lower than a third threshold; and generating an error database of the user according to the target objective question and the target subjective question.

10. An electronic device, comprising:

a processor, and a memory, configured to store a computer program which is executable by the processor, wherein the processor is configured to, when executing the computer program, perform the answer evaluation method according to claim 1.

11. A non-transitory computer readable medium having recorded thereon a computer program executable by a processor, the computer program comprising program code instructions for implementing the answer evaluation method according to claim 1.

* * * * *